(12) United States Patent
Nelson et al.

(10) Patent No.: US 6,628,005 B2
(45) Date of Patent: Sep. 30, 2003

(54) SINGLE SPEED TURBINE GENERATOR FOR DIFFERENT POWER SYSTEM OUTPUT FREQUENCIES IN POWER GENERATION SYSTEMS AND ASSOCIATED METHODS

(75) Inventors: Robert J. Nelson, Orlando, FL (US); Mark Robert Suchor, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 140 days.

(21) Appl. No.: 09/965,575

(22) Filed: Sep. 27, 2001

(65) Prior Publication Data

US 2003/0057706 A1 Mar. 27, 2003

(51) Int. Cl.$^7$ ................................................. H02P 9/44
(52) U.S. Cl. ......................... 290/40 C; 290/52; 322/29; 322/32
(58) Field of Search .................. 322/29, 32; 290/40 C, 290/52

(56) References Cited

U.S. PATENT DOCUMENTS

| | | | | |
|---|---|---|---|---|
| 4,031,407 A | * | 6/1977 | Reed | 307/87 |
| 4,246,531 A | * | 1/1981 | Jordan | 322/28 |
| 4,536,126 A | | 8/1985 | Reuther | 290/40 |
| 4,607,217 A | | 8/1986 | Bhargava | 324/78 |
| 4,906,060 A | * | 3/1990 | Claude | 322/29 |
| 5,239,251 A | * | 8/1993 | Lauw | 318/767 |
| 5,321,308 A | * | 6/1994 | Johncock | 290/40 C |
| 5,418,446 A | * | 5/1995 | Hallidy | 322/28 |
| 5,483,147 A | * | 1/1996 | Ilic et al. | 322/25 |
| 5,798,631 A | * | 8/1998 | Spee et al. | 322/25 |
| 6,486,640 B2 | * | 11/2002 | Adams | 322/59 |
| 2001/0022511 A1 | * | 9/2001 | Adams | 322/59 |

OTHER PUBLICATIONS

F. Joswig, S. Kulig; "Perceptions about new kinds of sub-synchronous resonances"; University of Dortmund; Institute for Electrical Machines, Drive and Power Electronics; D–44227 Germany.

* cited by examiner

Primary Examiner—Nicholas Ponomarenko

(57) ABSTRACT

A power generation system (10) and associated methods to compensate for different power system output frequencies are provided. The system (10) preferably includes a turbine (12) having a turbine rotor (13) positioned to rotate at a preselected rotational frequency and a generator (20) positioned to generate a power system output current at a preselected power system frequency. The generator (20) preferably has a generator stator (22) and a generator rotor (25) positioned within the generator stator (22) to induce electromotive force to the generator stator (22). The generator rotor (25) preferably is coupled to the turbine rotor (13) and driven by the turbine rotor at substantially the same preselected rotational frequency. The system (10) also preferably includes a frequency differentiator (30) coupled to the generator rotor (25) and connected to the power system electrical current output to differentiate between the preselected power system output frequency and the preselected rotational frequency of the generator rotor (25) so that variations in the preselected power system output frequency appear as variations in the generator rotor alternating electrical current frequency.

20 Claims, 3 Drawing Sheets

SINGLE SPEED TURBINE GENERATOR FOR DIFFERENT POWER SYSTEM OUTPUT FREQUENCIES IN POWER GENERATION SYSTEMS AND ASSOCIATED METHODS

FIELD OF THE INVENTION

This invention is related to the power generation industry and, more particularly, to the field of turbine generators and related methods.

BACKGROUND OF THE INVENTION

Within the power generation industry, large-scale power generators convert mechanical energy, typically the energy output of a turbine, into electrical energy. The basic components of such power generators are a frame-supported stator core that provides a high permeability path for magnetism and a rotor assembly positioned to rotate continuously within the stator core so as to induce electrical current through rotor-borne conductors moving through magnetic fields set up within the stator. The resulting current is carried by high-current conductors through and out from a housing surrounding the power generator, to connectors that provide the current to a plant bus for power distribution to consumers, commercial establishments, and other users of electrical power.

It is common in the power generation industry to use 50 Hertz (Hz) or 60 Hz gas or steam turbines, e.g., using air or steam cooling, in power plants for different applications and particular for efficiency and power output issues. These 50 Hz and 60 Hz designs are often used in simple cycle power plants and in combined cycle power plants to provide higher levels for efficiency and power output. A simple cycle power plant, for example, is one where a gas turbine which drives a generator is the sole source of power generation. A combined cycle power plant, for example, uses gas turbine exhaust to create steam which is utilized by a steam turbine.

Separate frequencies, e.g., 50 Hz versus 60 Hz, often require separate components for each frequency. This can require additional manufacturing constraints, require additional inventory, and require an increase in changeover costs. To reduce product cost, it is desirable to reduce the number of parts produced so that the larger volumes of those parts produced can result in lower part cost and reduced tooling investment.

With 50 Hz and 60 Hz synchronous applications, the turbine is usually required to operate at the delivery current Hz, e.g., at 3000 revolutions per minute (rpm) or 50 revolutions per second (rps) for two-pole 50 Hz applications and 3600 rpm or 60 rps for two-pole 60 Hz applications. If the turbine is rotated at a frequency other than synchronous, e.g., due to frequency variations, the blades in a turbine element, e.g., a low pressure turbine element, may resonate at their natural frequency. Blading mechanical fatigue can then result with subsequent damage and failure. Such problems can be expensive and time consuming to repair and can cost down time for the power generation system.

SUMMARY OF THE INVENTION

In view of the foregoing, the present invention advantageously provides a single speed turbine generator that can be used in different power system output frequencies, e.g., either 50 Hz or 60 Hz, applications of a power generation system for power plants. The present invention also advantageously provides a power generation system and associated methods that allow the same turbine and generator to be used in both 50 Hz and 60 Hz applications. Because a turbine system, e.g., a turbine or a turbine with a gear box (hereinafter "a turbine"), and a generator rotor always rotate at substantially the same speed according to the present invention, variations in system frequency appear as variations in the generator rotor alternating current frequency so that the turbine still operates at the same frequency as the generator rotor even though variations in the system frequency may occur. Hence, in view of this, the present invention additionally advantageously provides a power generation system and associated methods that allows enhanced turbine design. The present invention further advantageously provides a power generation system, a power generator, and associated methods that have enhanced stability characteristics.

More particularly, a power generation system, to compensate for different power system output frequencies according to the present invention, preferably includes a turbine having a turbine rotor positioned to rotate at a preselected rotational frequency and a generator positioned to generate a power system electrical output current at a preselected power system output frequency. The generator preferably has a generator stator and a generator rotor positioned within the generator stator to induce electromotive force to the generator stator. The generator rotor preferably is coupled to the turbine rotor to be driven by the turbine rotor at substantially the same preselected rotational frequency. The generator rotor preferably has a rotor body and a plurality of generator coils mounted to the rotor body to induce electromotive force to the generator stator during rotation. The power generation system also preferably includes a frequency differentiator coupled to the generator rotor and connected to the power system electrical current output to differentiate between the preselected power system output frequency and the preselected rotational frequency of the generator rotor so that variations in the preselected power system frequency appear as variations in the generator rotor alternating electrical current frequency to thereby compensate for different preselected power system output frequencies.

According to the present invention, the frequency differentiator can advantageously be provided by an exciter or other frequency differentiation systems, such as an electronic cyclo-converter or other AC to AC, DC to AC, or AC to DC converter, as will be understood by those skilled in the art. An exciter, for example, of the present invention preferably has an exciter rotor coupled to the generator rotor to provide a magnitomotive force to the generator rotor during rotation at the same preselected rotational speed. The exciter rotor preferably has a rotating armature including at least one coil positioned thereon, and more preferably a plurality of coils with a three-phase alternating current field winding. The frequency differentiator also preferably includes an alternating current regulator positioned to receive unregulated electrical current from the power system electrical output current at the preselected power system output frequency and positioned to supply a regulated alternating current to one or more coils of the rotating armature of the exciter so that the electrical frequency of the one or more coils of the rotating armature substantially equals a difference between the preselected power system output frequency and the preselected rotational frequency. Advantageously, a portion, e.g., about 5 percent to about 20 percent, of the power system electrical current output of the power generation system is transferred to the generator stator from the generator rotor.

The present invention further advantageously provides a method of compensating for different power system output frequencies in a power generation system. The method preferably includes selecting a desired power system output frequency for a power generation system, selecting a desired rotational frequency of a generator rotor of a generator of the power generation system, and differentiating between the selected power system output frequency and the selected rotational frequency of the generator rotor so that variations in the preselected power system output frequency appear as variations in generator rotor alternating electrical current frequency to thereby compensate for different preselected power system output frequencies. The method can also include the power generation system having an exciter coupled to the generator rotor and rotating at the same selected rotational frequency, and the step of differentiating can include regulating alternating current received from the power system alternating current output and supplying the regulated alternating current to the exciter.

The frequency difference, e.g., 5 Hz, between the frequency of the power system output and the rotational frequency of the generator rotor or exciter, for example, can then be added to or subtracted from the generator rotor frequency, e.g., 55 Hz, to thereby produce the desired power generation system output frequency, e.g., 50 Hz or 60 Hz. Because the electrical frequency of the generator rotor compensates for power system swings, the power generation system of the present invention allows for enhanced stability characteristics for different power system output frequencies.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 1:
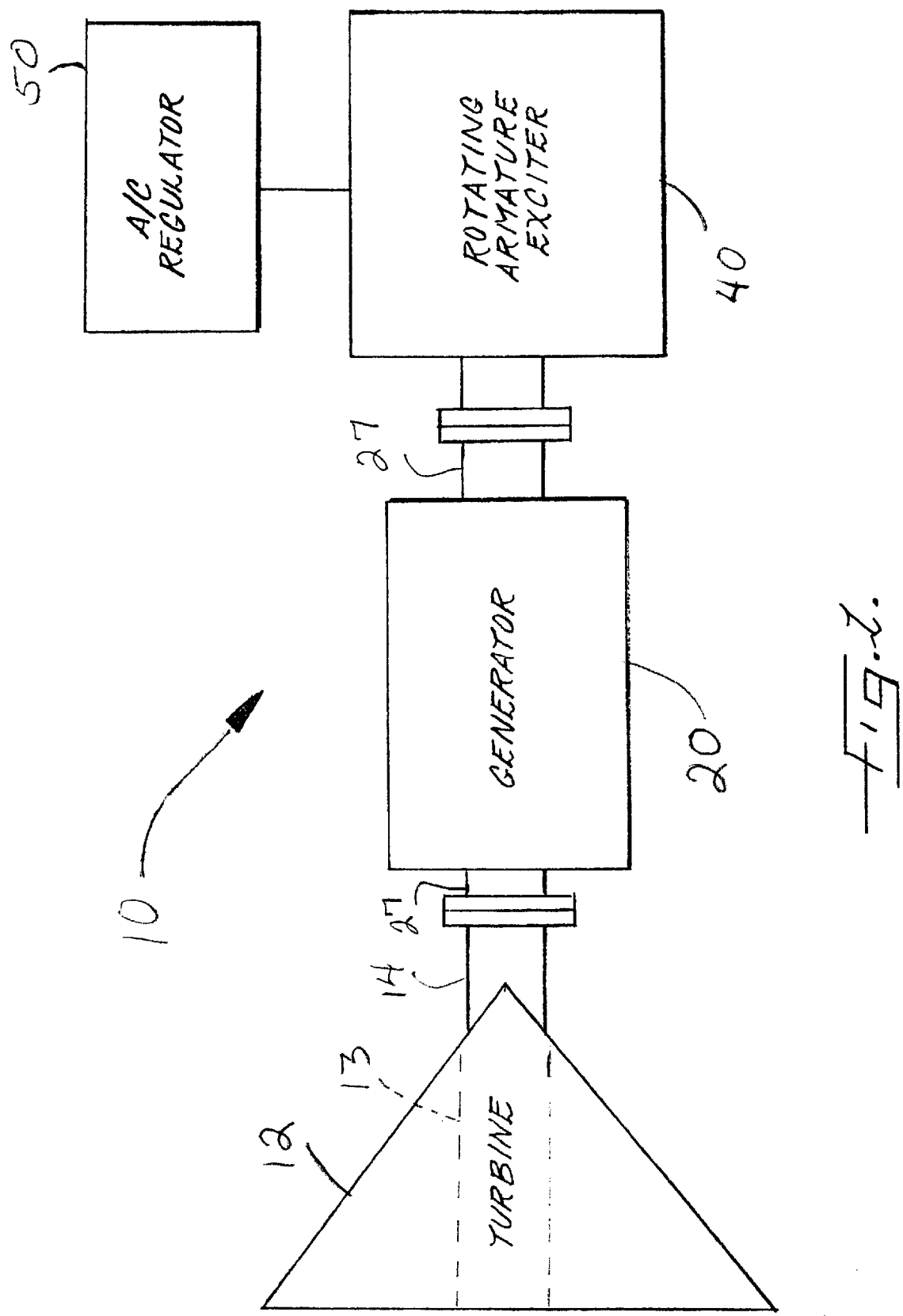
FIG. 1 is a schematic diagram of a power generation system according to the present invention.
Figure 2:
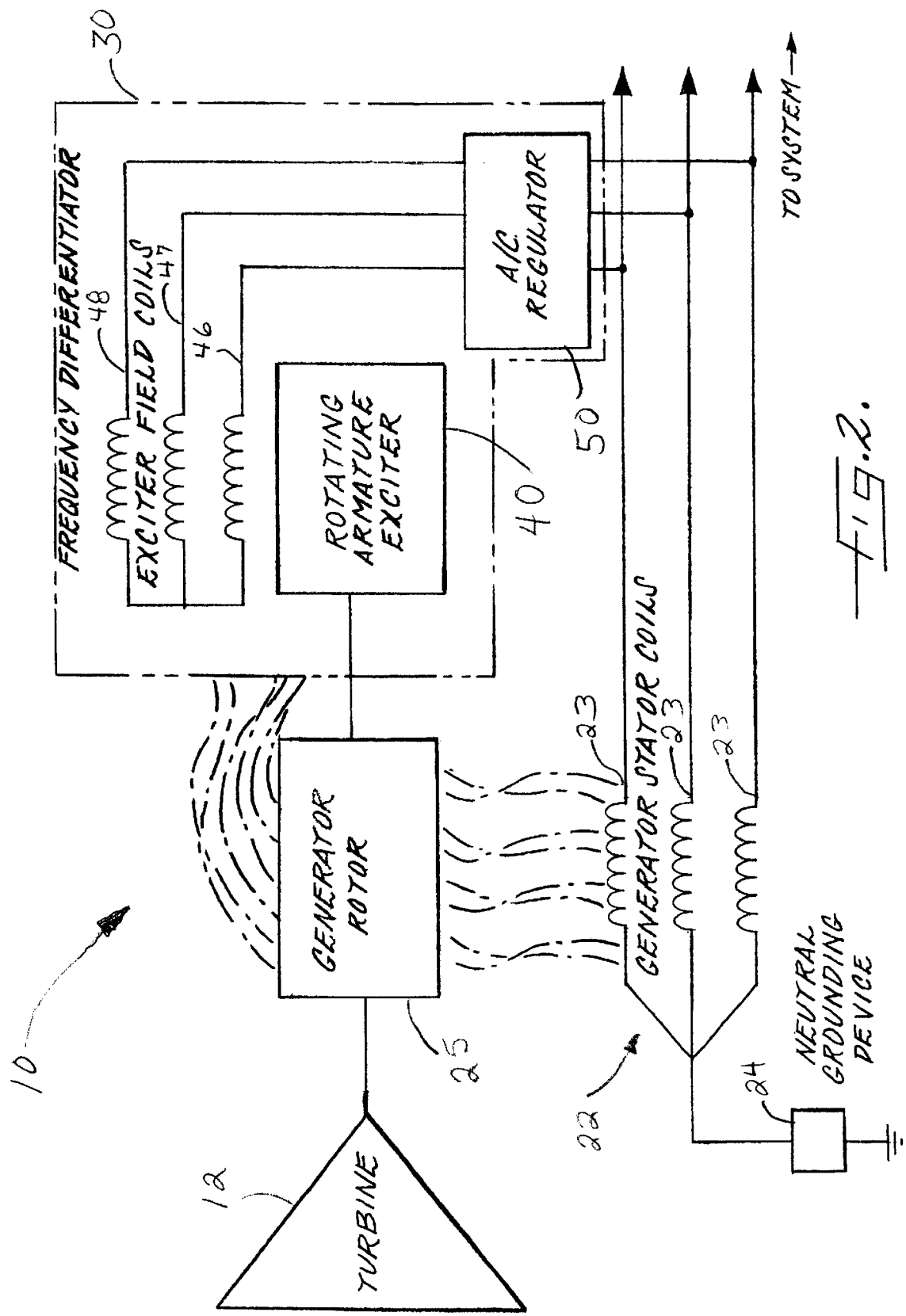
FIG. 2 is a schematic diagram of a power generation system according to the present invention.
Figure 3:
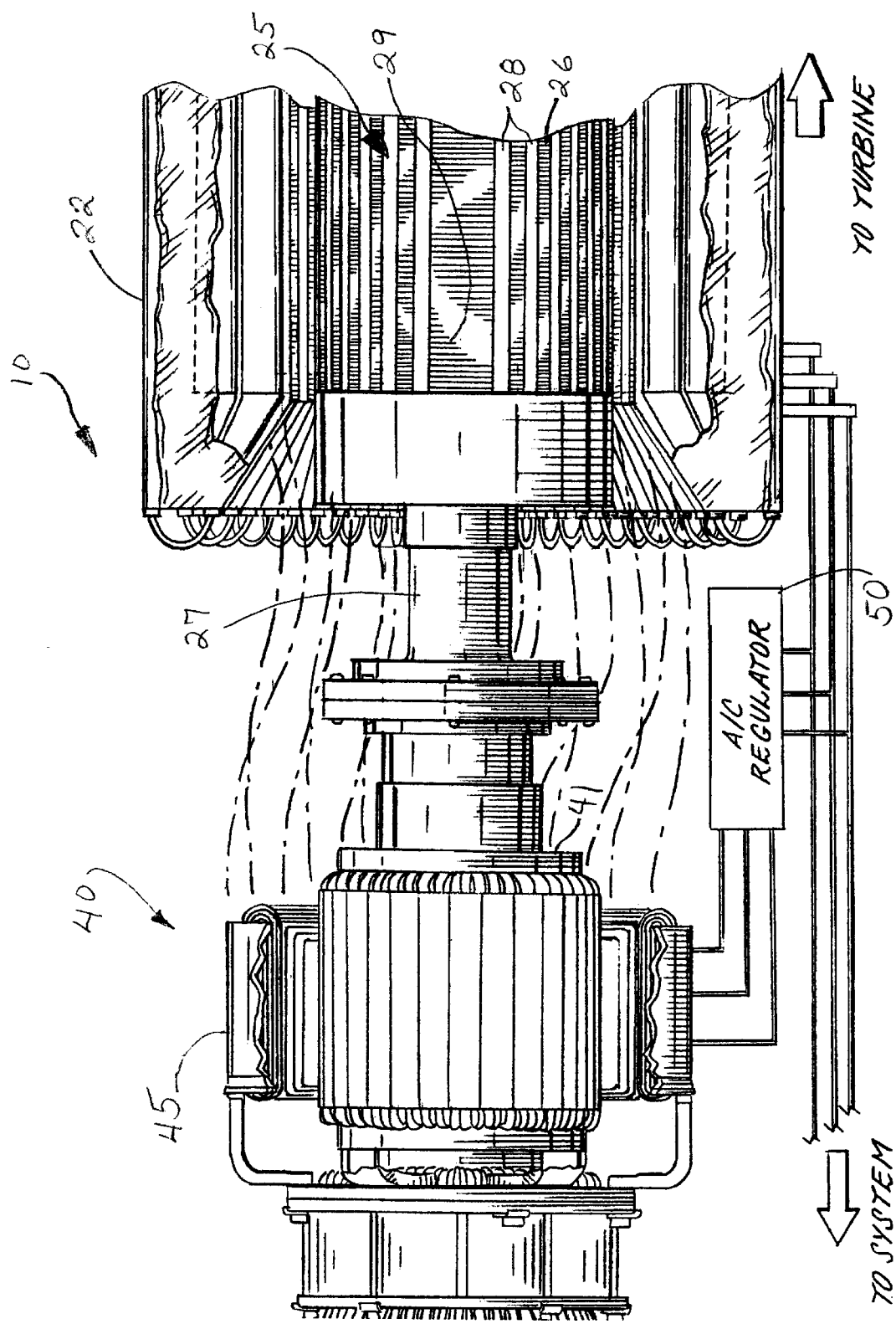
FIG. 3 is a fragmentary perspective view of a rotating armature exciter, a generator rotor, and a generator stator of a power generation system according to the present invention.

FIGS. 1–3 illustrate a power generation system 10 according to the present invention which compensates for different frequencies so that a single turbine generator 20 can be used for multiple frequency applications, e.g., both 50 Hz and 60 Hz applications. To compensate for different power system output frequencies, the power generation system 10 preferably includes a turbine 12 having a turbine rotor 13 positioned to rotate at a preselected rotational frequency or speed, e.g., 55 revolutions per second (corresponding to 3300 revolutions per minute, or 55 Hz electrical for a 2-pole generator), and a generator 20, e.g., a 2-pole synchronous generator with a three-phase alternating current field winding, positioned to generate a power system electrical output current at a preselected power system output frequency. The generator 20 preferably has a generator stator 22 and a generator rotor 25 positioned within the generator stator 22 to induce electromotive force to the generator stator 22. The generator rotor 25 preferably is coupled to the turbine rotor 13 to be driven by the turbine rotor 13 at substantially the same preselected rotational frequency. The generator rotor 25 preferably has a rotor body 26 and a plurality of generator coils 28 mounted to the rotor body 26 to induce electromotive force to the generator stator 22 during rotation. The generator rotor 25 preferably includes a rotor shaft 27, the turbine rotor 13 preferably includes a turbine shaft 14, and the generator rotor 25 preferably is coupled to the turbine rotor 13 by coupling the rotor shaft 27 to the turbine shaft 14 (see FIG. 1). The power generation system 10 preferably also includes a frequency differentiator 30 coupled to the generator rotor 25 and connected to the power system electrical current output to differentiate between the preselected power system output frequency and the preselected rotational frequency of the generator rotor 25 so that variations in the preselected power system frequency appear as variations in the generator rotor alternating electrical current frequency to thereby compensate for different preselected power system output frequencies. The supply to the field winding and the field winding coils preferably are oriented so that a traveling magnetic wave as illustrated (see FIG. 2) equal to the system frequency will be created in the generator core and gap.

The frequency differentiator 30 as used herein refers to taking a difference between the preselected power output frequency and the preselected rotational frequency. The frequency differentiator 30 preferably is provided by an exciter 40 having an exciter rotor 41 coupled to the generator rotor 25 to provide a magnitomotive force to the generator rotor 25, e.g., the coils of the rotor, at the same preselected rotational frequency. The exciter rotor 41 preferably has a rotating armature 45 including at least one coil positioned thereon and preferably a plurality of exciter field windings 46, 47, 48. The frequency differentiator 30 also preferably includes an alternating current ("AC") regulator 50 positioned to receive unregulated electrical current from the power system electrical output current at the preselected power system output frequency by a connection to each of the phases as shown (see FIG. 2). The AC regulator is also preferably positioned to supply a regulated alternating current to the at least one coil 46 of the rotating armature 45 of the exciter 40 to provide a magnitomotive force (MMF) at a frequency substantially equal to a difference between the preselected power system output frequency and the preselected rotational frequency as will be understood by those skilled in the art. If variations in the system frequency occur, then these variations show up as a slip frequency in the rotating armature 45 of the exciter 40.

The generator stator 22 also preferably has a plurality of stator coils 23 which provide a connection for the power system electrical current output and are connected to a neutral ground or grounding device 24 as understood by those skilled in the art. A portion, e.g., equal to the difference between the rotation frequency and the system frequency or the percent slip as understood by those skilled in the art (about 5 to about 20 percent), of the power system electrical current output, i.e., alternating current, of the power generation system 10 is transferred to the generator stator 22 from the generator rotor 25 which receives it from the at least one coil 46 of the rotating armature 45 of the exciter 40. The exciter rotating armature 45 preferably has a plurality of exciter alternating current coils or field windings, e.g., three-phase field winding, to thereby provide a plurality of alternating current phases. The exciter 40 preferably is excited at the preselected power system output frequency. As shown in FIG. 3, such an exciter 40 preferably is simple in design and would not have a collector or other rotating electronic components, e.g., diodes, as understood by those skilled in the art.

For example, the preselected frequency of the generator rotor 25 and the turbine rotor 13 can be about 55 Hertz, and the preselected power system output frequency can be either about 60 Hertz or about 50 Hertz. In such a power generation system 10 of the present invention, the generator rotor 25 and exciter 40 are each preferably larger than conventional generator rotors and exciters for a comparable system at a desired output frequency. As understood by those skilled in the art, the size of the generator rotor and exciter will be a function of the slip frequency, i.e., the larger the slip frequency the larger the rotor and exciter. Also, the generator rotor body 26 preferably includes a plurality of rotor body lamination layers 29 to thereby define a laminated rotor (see FIG. 3). Nevertheless, as understood by those skilled in the art such laminations may not be required. Each of the plurality of rotor body lamination layers 29, however, preferably are positioned adjacent another one of the plurality of rotor body lamination layers 29 in a stacked relationship in a plane extending tranverse to a longitudinal axis of the generator rotor shaft 27 as shown in FIG. 3. The power generation system 10 of the present invention allows the same turbine 12 and generator 20/exciter 40 to be used for both 50 Hz and 60 Hz applications, for example. The turbine rotor 13 and the generator rotor 25 preferably always rotate at the same speed and allows enhanced turbine designs as will be understood by those skilled in the art.

As shown in FIGS. 1–3, the present invention further advantageously provides a method of compensating for different power system output frequencies in a power generation system 10. The method preferably includes selecting a desired power system output frequency for a power generation system 10, selecting a desired rotational frequency of a generator rotor 25 of a generator 20 of the power generation system 10, and differentiating between the selected power system output frequency and the selected rotational frequency of the generator rotor 25 so that variations in the preselected power system output frequency appear as variations in generator rotor alternating electrical current frequency to thereby compensate for different preselected power system output frequencies. The method can also include the power generation system 10 having an exciter 40 coupled to the generator rotor 25 and rotating at the same selected rotational frequency, and the step of differentiating can include regulating alternating current received from power system alternating current output and supplying the regulated alternating current to the exciter 40.

The method can also include the exciter 40 having a rotating armature 45 with at least one coil 46, and the electrical frequency of the at least one coil 46 of the rotating armature 45 substantially equaling a difference between the selected power system output frequency and the selected rotational frequency. The method can further include the generator 20 further having a generator stator 22 positioned to receive induced electromotive force from the generator rotor 25 during rotation, and a portion of the alternating electrical current output of the power generation system 10 being transferred to the generator stator 22 from the generator rotor 25 which, in turn, receives it from the exciter 40. The selected rotational frequency of the generator rotor 25, for example, can be about 55 Hertz, and the selected power system output frequency, for example, can be about 60 Hertz or about 50 Hertz.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That claimed is:

1. A power generation system to compensate for different power system output frequencies, the system comprising:
    a turbine having a turbine rotor positioned to rotate at a preselected rotational frequency;
    a generator positioned to generate a power system output current at a preselected power system frequency, the generator having a generator stator and a generator rotor positioned within the generator stator to induce electromotive force to the generator stator, the generator rotor being coupled to the turbine rotor to be driven by the turbine rotor at substantially the same preselected rotational frequency, the generator rotor including a rotor body and a plurality of generator coils mounted to the rotor body to induce electromotive force to the generator stator during rotation; and
    a frequency differentiator coupled to the generator rotor and connected to the power system electrical current output to differentiate between the preselected power system output frequency and the preselected rotational frequency of the generator rotor so that variations in the preselected power system frequency appear as variations in the generator rotor alternating electrical current frequency to thereby compensate for different preselected power system output frequencies.

2. A power generation system as defined in claim 1, wherein the frequency differentiator comprises an exciter having an exciter rotor coupled to the generator rotor to provide magnitomotive force to the generator rotor at the same preselected rotational frequency, the exciter rotor having a rotating armature including at least one coil positioned thereon, and an alternating current regulator positioned to receive unregulated electrical current from the power system electrical output current at the preselected power system output frequency and positioned to supply a regulated alternating current to the at least one coil of the rotating armature of the exciter so that the electrical frequency of the at least one coil of the rotating armature substantially equals a difference between the preselected power system output frequency and the preselected rotational frequency.

3. A power generation system as defined in claim 2, wherein a portion of the power system electrical current output of the power generation system is transferred to the generator rotor from the at least one coil of the rotating armature of the exciter and then to the generator stator.

4. A power generation system as defined in claim 3, wherein the portion of the power system electrical current output is about 5 to about 20 percent of the power system electrical current output of the power generation system.

5. A power generation system as defined in claim 2, wherein the exciter rotating armature includes a plurality of exciter alternating current coils to thereby provide a plurality of alternating current phases, and wherein the exciter is excited at the preselected power system output frequency.

6. A power generation system as defined in claim 1, wherein the preselected rotational frequency of the generator rotor and the turbine rotor is about 55 Hertz, wherein the generator rotor includes a rotor shaft, wherein the turbine rotor includes a turbine shaft, and wherein the generator rotor is coupled to the turbine rotor by coupling the rotor shaft to the turbine shaft.

7. A power generation system as defined in claim 6, wherein the preselected power system output frequency is either about 60 Hertz or about 50 Hertz.

8. A power generation system as defined in claim 7, wherein the generator rotor body includes a plurality of rotor body lamination layers to thereby define a laminated rotor, each of the plurality of rotor body lamination layers being positioned adjacent another one of the plurality of rotor body lamination layers in a stacked relationship in a plane extending tranverse to a longitudinal axis of the generator rotor shaft.

9. A power generation system to compensate for different power system output frequencies, the system comprising:
    a turbine having a turbine rotor positioned to rotate at a preselected rotational frequency;
    a generator positioned to generate a power system output current at a preselected power system frequency, the generator having a generator stator and a generator rotor positioned within the generator stator to induce electromotive force to the generator stator, the generator rotor being coupled to the turbine rotor to be driven by the turbine rotor at substantially the same preselected rotational frequency, the generator rotor including a rotor body and a plurality of generator coils mounted to the rotor body to induce electromotive force to the generator stator during rotation;
    an exciter having an exciter rotor coupled to the generator rotor to provide magnitomotive force to the generator rotor at the same preselected rotational frequency, the exciter rotor having a rotating armature including at least one coil positioned thereon; and
    an alternating current regulator positioned to receive unregulated electrical current from the power system electrical output current at the preselected power system output frequency and positioned to supply a regulated alternating current to the at least one coil of the rotating armature of the exciter so that the electrical frequency of the at least one coil of the rotating armature substantially equals a difference between the preselected power system output frequency and the preselected rotational frequency.

10. A power generation system as defined in claim 9, wherein a portion of the power system electrical current output of the power generation system is transferred to the generator rotor from the at least one coil of the rotating armature of the exciter and then to the generator stator.

11. A power generation system as defined in claim 10, wherein the portion of the power system electrical current output is about 5 to about 20 percent of the power system electrical current output of the power generation system.

12. A power generation system as defined in claim 10, wherein the exciter rotating armature includes a plurality of exciter alternating current coils to thereby provide a plurality of alternating current phases, and wherein the exciter is excited at the preselected power system output frequency.

13. A power generation system as defined in claim 12, wherein the preselected rotational frequency of the generator rotor and the turbine rotor is about 55 Hertz, wherein the generator rotor includes a rotor shaft, wherein the turbine rotor includes a turbine shaft, and wherein the generator rotor is coupled to the turbine rotor by coupling the rotor shaft to the turbine shaft.

14. A power generation system as defined in claim 13, wherein the preselected power system output frequency is either about 60 Hertz or about 50 Hertz.

15. A power generation system as defined in claim 14, wherein the generator rotor body includes a plurality of rotor body lamination layers to thereby define a laminated rotor, each of the plurality of rotor body lamination layers being positioned adjacent another one of the plurality of rotor body lamination layers in a stacked relationship in a plane extending tranverse to a longitudinal axis of the generator rotor shaft.

16. A method of compensating for different power system output frequencies in a power generation system, the method comprising:
    selecting a desired power system output frequency for a power generation system;
    selecting a desired rotational frequency of a generator rotor of a generator of the power generation system; and
    differentiating between the selected power system output frequency and the selected rotational frequency of the generator rotor so that variations in the preselected power system output frequency appear as variations in generator rotor alternating electrical current frequency to thereby compensate for different preselected power system output frequencies.

17. A method as defined in claim 16, wherein the power generation system includes an exciter coupled to the generator rotor and rotating at the same selected rotational frequency, and wherein the step of differentiating includes regulating alternating current received from power system alternating current output and supplying the regulated alternating current to the exciter.

18. A method as defined in claim 17, wherein the exciter includes a rotating armature having at least one coil, and wherein the electrical frequency of the at least one coil of the rotating armature substantially equals a difference between the selected power system output frequency and the selected rotational frequency.

19. A method as defined in claim 17, wherein the generator further includes a generator stator positioned to receive induced electromotive force from the generator rotor during rotation, and wherein a portion of the power system electrical current output of the power generation system is transferred to the generator stator from the generator rotor.

20. A method as defined in claim 19, wherein the selected rotational frequency of the generator rotor is about 55 Hertz, and wherein the selected power system output frequency is either about 60 Hertz or about 50 Hertz.

* * * * *